May 27, 1952      J. W. PAGE      2,598,421
VERTICALLY ADJUSTABLE SEAT FOR VEHICLES
Filed July 21, 1947      4 Sheets-Sheet 1
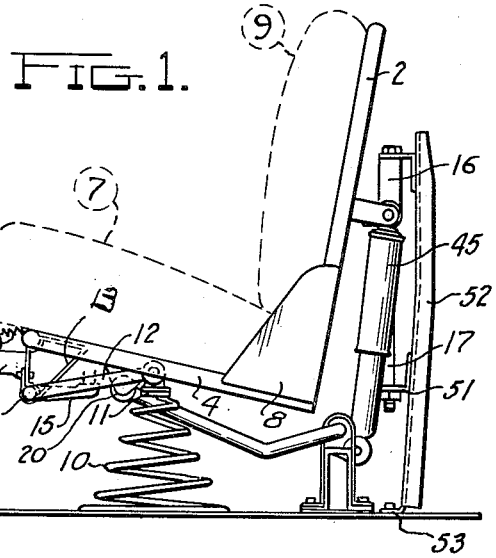
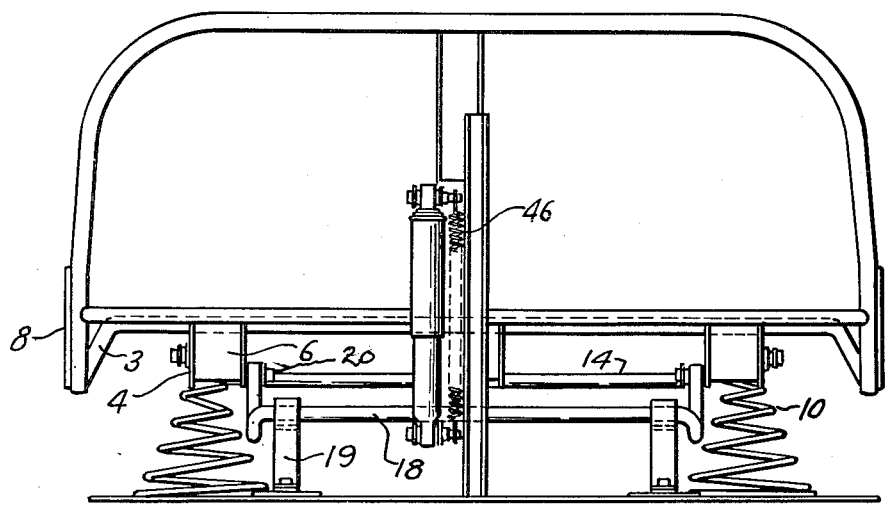
INVENTOR.
John Wallace Page
BY May 27, 1952     J. W. PAGE     2,598,421
VERTICALLY ADJUSTABLE SEAT FOR VEHICLES
Filed July 21, 1947     4 Sheets-Sheet 2
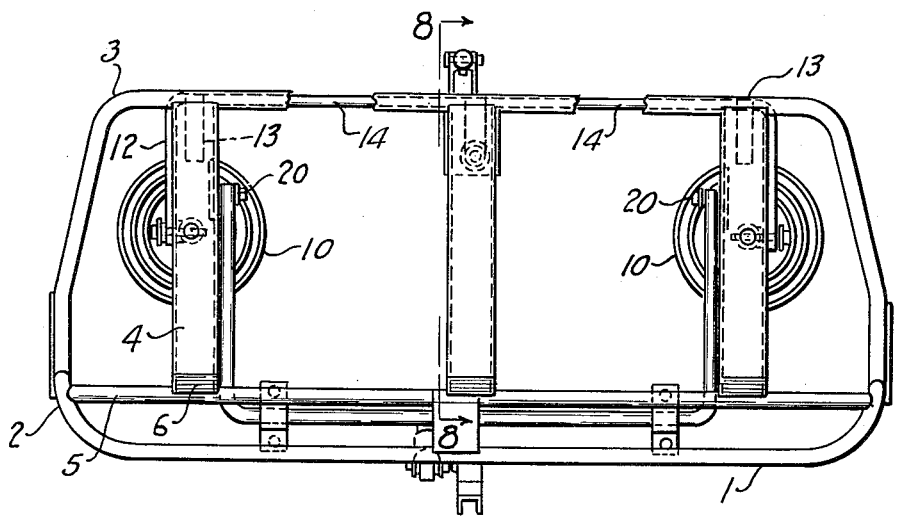
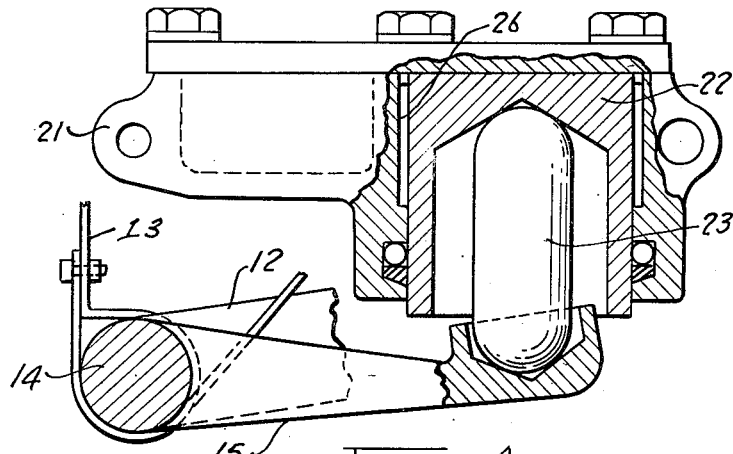
INVENTOR.
John Wallace Page
BY
Barnes, Kisselle, Laughlin & Raise INVENTOR.
John Wallace Page
BY
Barnes, Kisselle, Laughlin & Raisch
ATTORNEYS May 27, 1952    J. W. PAGE    2,598,421

VERTICALLY ADJUSTABLE SEAT FOR VEHICLES

Filed July 21, 1947    4 Sheets-Sheet 4

INVENTOR.
John Wallace Page
BY
Barnes, Kisselle, Laughlin & Rausch

Patented May 27, 1952

2,598,421

UNITED STATES PATENT OFFICE 2,598,421

VERTICALLY ADJUSTABLE SEAT FOR VEHICLES

John Wallace Page, Adrian, Mich., assignor to Stubnitz-Greene Spring Corporation, Adrian, Mich., a corporation of Michigan Application July 21, 1947, Serial No. 762,397

7 Claims. (Cl. 155—9)

This invention relates to seats, particularly seats for cabs, commercial trucks and vehicles.

An object of the invention is to provide a seat, the height of which may be easily adjusted by means of a hydraulic pump and a valve release operated by the pump handle. Hence, when a heavy load is placed on the seat, the seat may be easily adjusted to maintain the driver's line of vision.

Another object of the invention is to provide an improved guide for a seat and seat back frame which is arranged to move up and down as one unit when the cab is subjected to jolts due to an uneven road or obstacles. These and other advantages will appear more in detail in the following description.

In the drawings:

Fig. 1 is an end elevation of my improved seat.

Fig. 2 is a rear elevation of the same.

Fig. 3 is a plan view of the seat.

Fig. 4 is a detail, partly in section, showing the hydraulic motor.

Figure 5:
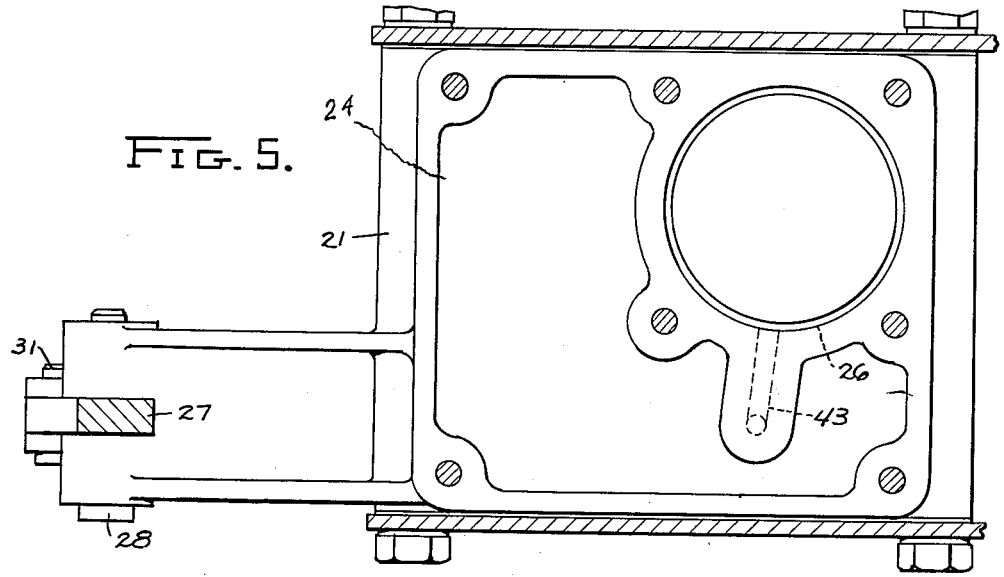
Fig. 5 is a plan view of the hydraulic pump and motor unit.

The seat frame consists primarily of a tubular frame member that forms the top frame member 1, the two upright end frame members 2 and the seat bottom frame member 3. Two of the cross channels 4 extend from the rear seat bottom tube 5 to the front of the seat bottom frame 3. The center channel 4 extends from the top frame member 1 to the front seat frame member 3. These cross channels 4 have each a drop portion 6 at the rear that drops the main portion of the cross channels 4 down to the lower level for taking the seat bottom cushion 7. The seat bottom frame 3 with these cross members 4 serves to suspend the seat bottom cushion 7. At the rear in the corner between the seat bottom frame and the seat back frame are gusset plates 8 which fit over the joint between the seat bottom cushion 7 and the seat back cushion 9 and hold these cushions in place.

This combined seat back frame and seat bottom frame is supported by the heavy conical springs 10, one at each end. The top coils of springs 10 engage pivoted abutments 11 (Fig. 1) carried on the ends of the crank arms 12. The crank arms 12 are the bent ends of the shaft 14 which is journalled to swing in the suspension straps 13 secured to the cross members 4. This rock shaft has a lever arm 15 (see Fig. 4) by which the rock shaft 14 and the crank arms 12 may be turned. When the hydraulic lift presses upon the lever arm 15, it acts upon the crank arms 12 to boost the seat upwardly on the supporting springs 10 in a way to be later described. The back frame of the seat is fastened by clip 50 to the sleeve 16 which is guided in up and down movement on the rod 17, which is fastened by bracket 51 to post 52 which can be fastened to the floor at the back of the cab at 53.

When a load is placed on the seat the torsion bar 18, which is supported to turn in brackets 19 secured to the floor of the cab, will prevent the seat from twisting or dropping down further at one end than the other end. The ends of this torsion bar are pivoted to the end cross members 4 at the points 20. Consequently, the load on one end of the seat will be transmitted to the seat bottom frame at the other end through the arm of the torsion bar at the other end of the seat. The seat will move down, seat back and seat bottom together, guided on the track provided at the rear by the sleeve 16 and the rod 17. At the front of the seat the load will be communicated from the seat frame to the suspension straps 13. These straps 13 journal the crank shaft 14 and when the load carries the straps downward the crank shaft 14 will be carried down with the straps.

Fastened to the front of the seat is a pump and motor fixture 21 which moves down with the seat and its load. The motor has a piston 22 (Fig. 4) and a push link 23. This push link encounters the lever arm 15 attached to crank shaft 14. Consequently, the piston 22 and push link 23 prevent the crank shaft 14 and the crank arms 12 rotating on the pivoted abutments 11 which engage the tops of the springs 10. The crank and the crank arms are all tied together with the seat frame by the lever arm 15, the push link 23, the piston 22 and the hydraulic backing of the piston and the hydraulic motor cylinder 26. If an extra persons gets into the front seat, or even two persons besides the driver, then the load is so much heavier that both springs 10 will be further depressed and, consequently, the whole seat will go down and alter the line of vision of the driver. This is very undesirable because in driving trucks, and particularly large trucks, it is advantageous to have the driver's line of vision not interfered with, particularly in connection with one or more rear vision mirrors that may be used and some of which may have a permanent adjustment or cannot be easily altered. Consequently, it is highly desirable that the driver's seat level be always the same regardless of the amount of load on the seat. This I attain by means of the adjustment I am about to describe.

Figure 6:
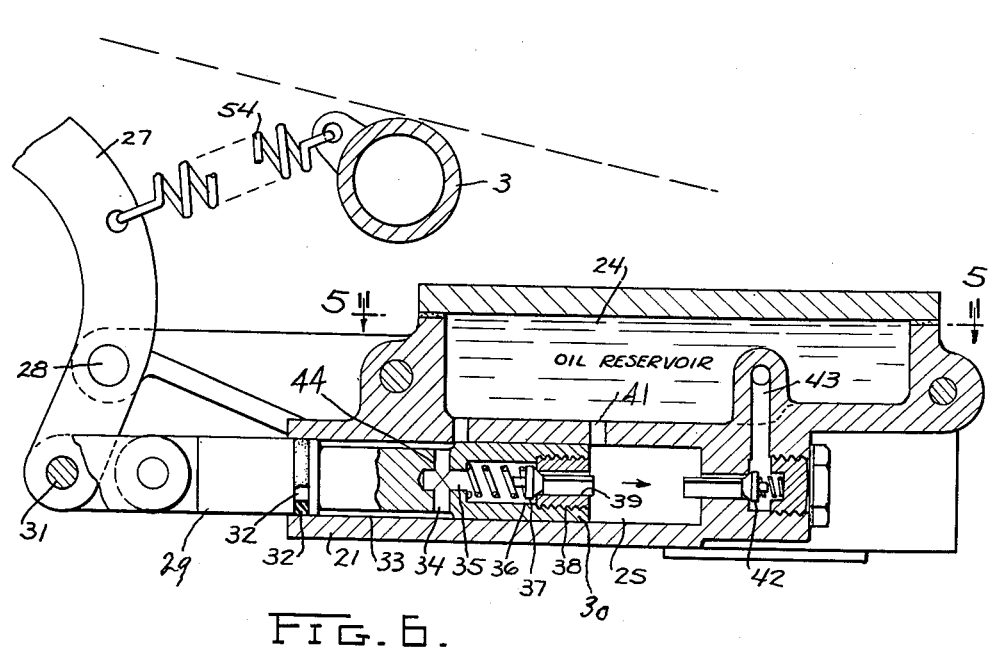
Fig. 6 is a section showing the hydraulic pump and valve release.
Figure 9:
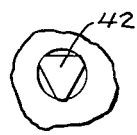
Fig. 9 is an end view of the check valve stem. This valve is in the hydraulic jack.
Figure 7:
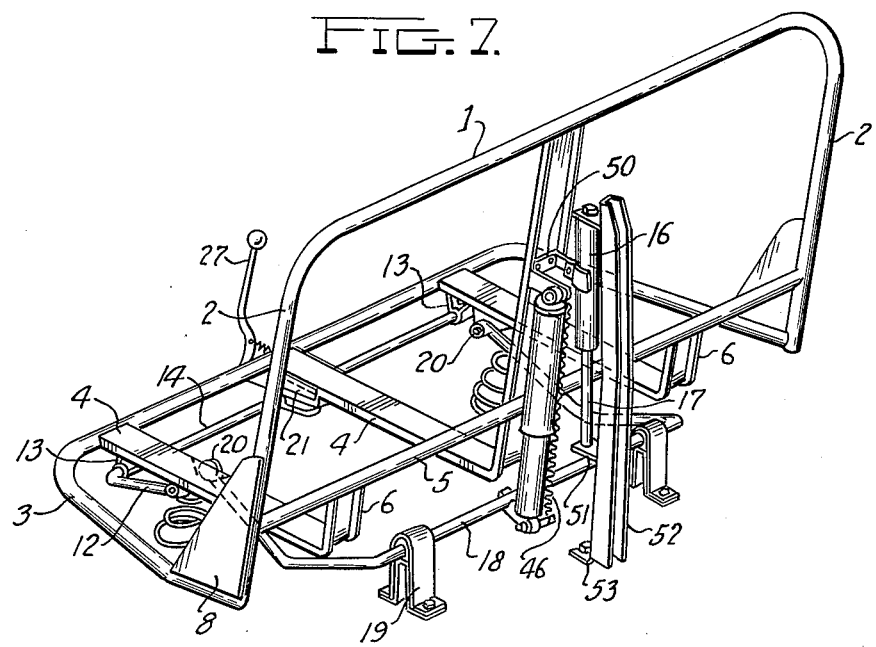
Fig. 7 is a perspective of the seat frame and the operating parts.
Figure 8:
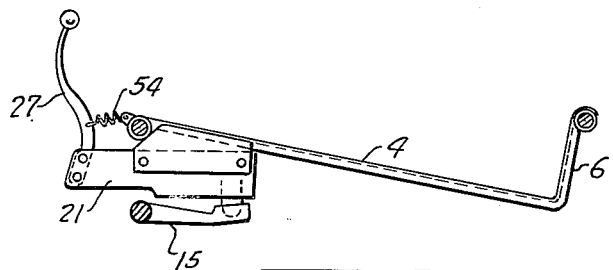
Fig. 8 is a section on the line 8—8 of Fig. 3 showing a detail of the hydraulic unit and its attachment to the middle cross member.

Secured to the middle cross channel is the fixture 21 which contains an oil reservoir 24, a pump cylinder 25 and a vertical motor cylinder 26. A hand lever 27 is fulcrumed on the fixture at 28 and linked to the stem 29 of pump piston 30 at pivot point 31. This pump piston 30 has a sealing ring 32 and a wide annular groove 33 which connects by a cross passage 34 with an axial passage 35 through the center of the piston to the spring chamber 36. Valve 37 engages the valve seat on the screw plug 38 which has an opening 39 through the center of the screw plug. The screw plug 38 forms the valve seat and the spring-pressed valve 37 is a pressure relief valve which will release the pressure in the motor cylinder when the hand lever 27 is thrown all the way forward, as later to be explained. The hand lever 27 is worked back and forth in short strokes to pump liquid from the oil reservoir into the motor cylinder 26. The pump piston, as shown in Fig. 6, is in position to allow liquid to flow through port 41 from the reservoir into the pump cylinder ahead of the piston. This piston in its pump action is given a short throw forward. This covers up the intake port 41 and forces the oil out past the exhaust valve 42 which is spring controlled. Liquid passes through the passage 43 (Figs. 5 and 6) to the pump cylinder 26. Here the liquid gets behind the motor piston 22, and causes relative movement of the piston and cylinder. The springs prevent the arms 12 and 15 going downward so the cylinder 26 and motor fixture 21 have to go up. This pushes up the front of the seat and the back of the seat rides up on the guide furnished by the sleeve 16 and the rod 17. The pumping is continued with short throws of the hand lever back and forth until the seat is raised to the correct height. To release the seat and allow the seat to drop one has only to throw the hand lever 27 fully forward. This brings the stems of the two valves 37 and 42 into contact and opens both valves and liquid will flow through the spring chamber 36, the passageways 35 and 34 and the annular groove 33 and through port 44 back into the reservoir, and the oil or liquid will continue to escape from the motor cylinder and allow the seat to drop until the hand lever is released and is pulled back by spring 54 connected to the front frame 3 (Fig. 6). Then the relief valve promptly closes and the seat is retained in its adjusted position.

The heavy springs that support the seat give a sharp throw when the cab is jolted and, consequently, in order to cushion this throw I provide a standard shock absorber 45. This may be in the form of a dashpot (not shown), preferably hydraulic, and need not be here described. Tension spring 46 tends to draw the two telescoping members of the shock absorber or dashpot together. When the downward movement takes place after the upward throw of the springs the dashpot action also cushions the downward movement.

What I claim is:

1. An adjustably raised and lowered seat for a cab or other vehicle, having in combination a seat bottom and seat back frame for supporting the seat bottom and seat back cushions, a guide, means for supporting one part of the guide from the floor of the vehicle and means securing another part of the guide to the seat back frame for guiding the same in up and down movement, a crank shaft pivoted to the seat bottom frame and provided with crank arms and a lever arm for moving the frame up and down, supporting springs for engaging the floor, with one spring engaging each crank arm end, and means engaging between the seat bottom frame and the said lever arm for adjustably spacing the arm from the seat bottom frame and thereby raising and lowering the frame upon each spring.

2. An adjustably raised and lowered seat for a cab or other vehicle, having in combination a seat bottom and seat back frame for supporting the seat bottom and seat back cushions, a guide, means for supporting one part of the guide from the floor of the vehicle and means securing another part of the guide to the seat back frame for guiding the same in up and down movement, a crank shaft pivoted to the seat bottom frame and provided with crank arms and a lever arm for moving the frame up and down, supporting springs for engaging the floor, with one spring engaging each crank arm end, and means engaging between the seat bottom frame and the said lever arm for adjustably spacing the arm from the seat bottom frame and thereby raising and lowering the frame upon each spring, the said means comprising a hydraulically adjustable spacer.

3. An adjustably raised and lowered seat for a cab or other vehicle, having in combination a seat bottom and seat back frame for supporting the seat bottom and seat back cushions, a guide, means for supporting one part of the guide from the floor of the vehicle and means securing another part of the guide to the seat back frame for guiding the same in up and down movement, a crank shaft pivoted to the seat bottom frame and provided with crank arms and a lever arm for moving the frame up and down, supporting springs for engaging the floor, with one spring engaging each crank arm end, and means engaging between the seat bottom frame and the said lever arm for adjustably spacing the arm from the seat bottom frame and thereby raising and lowering the frame upon each spring, the said means comprising a hydraulically adjustable spacer comprising a hydraulic pump and a hydraulic motor and control devices for locking a desired amount of liquid in the hydraulic motor to hold the adjustment.

4. An adjustably raised and lowered seat for a cab or other vehicle, having in combination a seat bottom and seat back frame for supporting the seat bottom and seat back cushions, a guide, means for supporting one part of the guide from the floor of the vehicle and means securing another part of the guide to the seat back frame for guiding the same in up and down movement, a crank shaft pivoted to the seat bottom frame and provided with crank arms and a lever arm for moving the frame up and down, supporting springs for engaging the floor, with one spring engaging each crank arm end, and means engaging between the seat bottom frame and the said lever arm for adjustably spacing the arm from the seat bottom frame and thereby raising and lowering the frame upon each spring, the said means comprising a hydraulic motor with a piston, a thrust link, the latter engaging the lever arm and the piston and a hydraulic pump for pumping liquid behind the piston in the motor cylinder to raise the seat by pushing the piston and thrust link down onto the lever arm and the crank arm down onto the coiled spring, and means for locking the liquid in the cylinder to hold the adjustment or release the liquid to lower the seat frame.

5. An adjustably raised and lowered seat for a cab or other vehicle, having in combination a seat bottom and seat back frame for supporting the seat bottom and seat back cushions, a guide, means for supporting one part of the guide from the floor of the vehicle and means securing another part of the guide to the seat back frame for guiding the same in up and down movement, a crank shaft pivoted to the seat bottom frame and provided with crank arms and a lever arm for moving the frame up and down, supporting springs for engaging the floor, with one spring engaging each crank arm end, and means engaging between the seat bottom frame and the said lever arm for adjustably spacing the arm from the seat bottom frame and thereby raising and lowering the frame upon each spring, the said means comprising a hydraulic power and adjusting unit comprising a pump and a motor cylinder filled with liquid by oscillating the piston of the pump in short strokes, and a check valve for holding the liquid in the motor cylinder, said motor cylinder secured to the seat frame and having a push connection with the lever arm of the crank shaft.

6. An adjustably raised and lowered seat for a cab or other vehicle, having in combination a seat bottom and seat back frame for supporting the seat bottom and seat back cushions, a guide, means for supporting one part of the guide from the floor of the vehicle and means securing another part of the guide to the seat back frame for guiding the same in up and down movement, a crank shaft pivoted to the seat bottom frame and provided with crank arms and a lever arm for moving the frame up and down, supporting springs for engaging the floor, with one spring engaging each crank arm end, means engaging between the seat bottom frame and the said lever arm for adjustably spacing the arm from the seat bottom frame and thereby raising and lowering the frame upon each spring, the said means comprising a hydraulic power and adjusting unit comprising a pump and a motor cylinder filled with liquid by oscillating the piston of the pump in short strokes, a check valve for holding the liquid in the motor cylinder, said motor cylinder secured to the seat unit and having a push connection with the lever arm of the crank shaft, and a relief valve for relieving the liquid in the motor cylinder and lowering the seat, the said pump piston, when given a long throw, serving to open the relief valve to release the liquid in the motor cylinder.

7. An adjustably raised and lowered seat for a cab or other vehicle, having in combination a seat bottom and seat back frame for supporting the seat bottom and seat back cushions, a guide, means for supporting one part of the guide from the floor of the vehicle and means securing another part of the guide to the seat back frame for guiding the same in up and down movement, a crank shaft pivoted to the seat bottom frame and provided with crank arms and a lever arm for moving the frame up and down, supporting springs for engaging the floor, with one spring engaging each crank arm end, means engaging between the seat bottom frame and the said lever arm for adjustably spacing the arm from the seat bottom frame and thereby raising and lowering the frame upon each spring, and a torsion bar comprising a shaft, means providing journals for said shaft, and arms extending from said shaft and pivotally connected to the seat frame at opposite ends to cause the seat depression or raising to be substantially uniform at both ends.

JOHN WALLACE PAGE.

REFERENCES CITED

The following references are of record in the file of this patent:

UNITED STATES PATENTS

| Number | Name | Date |
|---|---|---|
| 697,449 | Collins | Apr. 15, 1902 |
| 1,770,321 | Mougeotte | July 8, 1930 |
| 1,929,023 | Hickman | Oct. 3, 1933 |
| 2,142,358 | Kaiser | Jan. 3, 1939 |
| 2,152,024 | Brosset | Mar. 28, 1939 |
| 2,357,825 | Hickman et al. | Sept. 12, 1944 |
| 2,367,829 | Shinn | Jan. 23, 1945 |
| 2,550,170 | Spiess et al. | Apr. 24, 1951 |